May 18, 1926.
J. A. FISCHER
SWITCH
Filed March 27, 1925
1,584,761
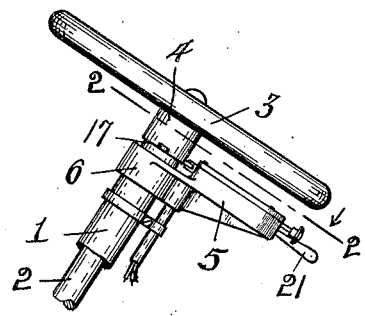
Fig. 1.
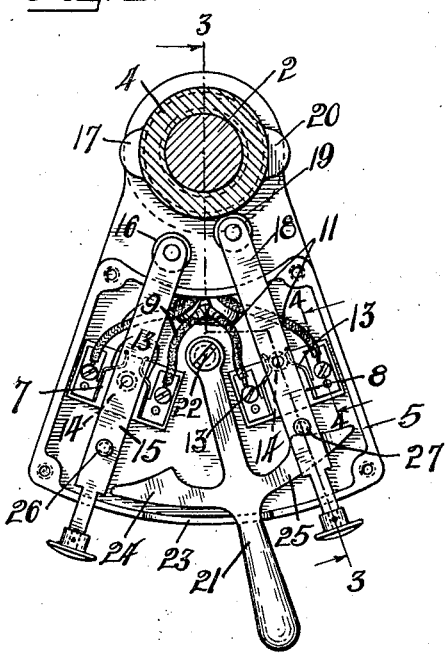
Fig. 2.
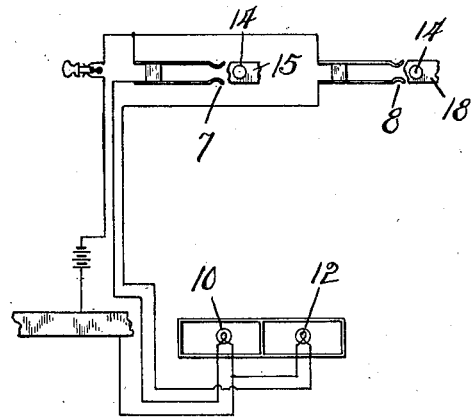
Fig. 5.
Fig. 6.
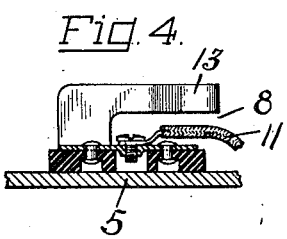
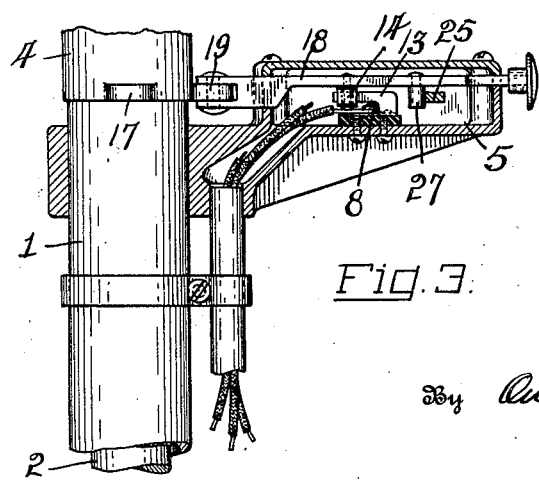
Fig. 4.
Fig. 3.
Inventor
John A. Fischer,
By Owen Owen & Crampton,
Attorneys.

Patented May 18, 1926.

1,584,761

UNITED STATES PATENT OFFICE.

JOHN A. FISCHER, OF TOLEDO, OHIO.

SWITCH.

Application filed March 27, 1925. Serial No. 18,665.

This invention relates to signal means for use on automobiles, and particularly to a direction signal to indicate the intended direction of turning of the vehicle.

The primary object of the invention is the provision of a simple, efficient and unique electrical means of the character described, which is manually operable to indicate the intended direction of turning and is automatically restored to its neutral or inoperative condition by a back-turning of the steering means to straightaway position.

The invention is fully described in the following specification, and while in its broader aspect it is capable of embodiments in numerous forms, one embodiment thereof is illustrated, in which,—

Figure 1 is a side elevation of a portion of the steering means of an automobile with the invention associated therewith. Figure 2 is an enlarged cross-section thereof taken on the line 2—2 in Fig. 1 with the cover plate of the signal control means removed and with one switch in closed position. Fig. 3 is a section on the line 3—3 in Fig. 2 with parts in full. Fig. 4 is an enlarged section on the line 4—4 in Fig. 2. Fig. 5 is a diagram of the electrical circuit employed, and Fig. 6 is an elevation of the direction indicating portion of the signal means.

Referring to the drawings, 1 designates the customary stationary steering wheel column of an automobile, 2 the steering post extending through said column, and 3 the hand steering wheel mounted on the upper end of the post and having the hub portion 4.

A case 5 for enclosing the switch parts is disposed in radial spaced relation to the wheel hub 4, preferably at the rear side thereof, and has a bracket arm 6 projected downward and forward therefrom for clamping in any suitable manner to the column 1. The case contains a left-hand electrical switch 7 and a right-hand electrical switch 8, the leads 9 of the former having the left-hand signal light 10 in circuit therewith, and the leads 11 of the right-hand switch 8 having the right-hand signal lamp 12 in circuit therewith, as clearly shown by the wiring diagram in Fig. 5.

Each of the switches in the present instance is shown as comprising spaced spring terminal fingers 13 and a bridging contact 14, which is movable into and out of bridging contact with the respective set of fingers 13. The contact 14 of the switch 7 is carried by a bar 15, which is mounted for longitudinal movements in the case 5 in a substantial radial relation to the steering wheel hub 4 and has its inner end projected inwardly from the case and carrying a roller 16, which, when the bar is pushed inward to switch closing position, stands in the path of movement of a cam projection 17 on the hub 4.

The contact 14 of the switch 8 is carried by a bar 18, which is mounted in the case 5 similarly to the bar 15 and has its inner end carrying a roller 19, which, when the bar is in inwardly depressed or switch-closing position, stands in the path of movement of a cam projection 20 on the hub 4. The outer ends of the bars 15 and 18 preferably project without the rear side of the case 5 in accessible position to be manually pushed inward.

The projections 17 and 20 on the wheel hub are disposed at opposite sides of the wheel hub so that when the wheel has been turned a predetermined distance to the left in making a left-hand turn, the projection 17 will strike the roller 16 or inner end of the bar 15 and force the latter out to inoperative position. The projection 20 is likewise positioned so that when the wheel has been turned a predetermined distance to the right after an inward movement of the bar 18, said projection will strike the roller 19 or inner end of the bar 18 and force the bar back to its open circuit position.

In order to provide a unitary means for throwing either switch bar 15 or 18 to circuit closing position, a lever 21 is pivoted at 22 within the case 5 between the two switches and projects rearwardly therefrom through a transversely elongate slot 23 in the rear side of the case, so that its outer end is in accessible position without the case. Arms 24 and 25 project laterally in opposite directions from the lever 21 within the rear portion of the case 5, and the former, when the lever is thrown to the left from its neutral position, is adapted to engage a pin or projection 26 on the bar 15 and force such bar inward to switch-closing position, while the latter arm 25, when the lever is thrown to the right from neutral position, is adapted to engage a pin or projection 27 on the bar 18 and force such bar inward to switch-closing position. It is thus evident that a natural swinging movement of the control lever 21 in the direction of intended turning of the vehicle will act to close the switch of the light of the vehicle at that side, thus indicating to any one near that a turn is to be made and the direction of such turn.

I wish it understood that my invention is not limited to any specific arrangement, construction or form of the parts as it is capable of numerous modifications and changes without departing from the spirit of the claim.

Having thus described my invention, what I claim as new and desire to secure by Letters Patent, is:—

An electric switch adapted to be arranged contiguous a rotatable steering part having spaced projections thereon, comprising a case, a pair of spaced sets of contact elements in said case, reciprocable members for said sets adapted for engagement therewith and each having a part movable into the path of one of said projections when the respective member is moved to circuit closing position whereby predetermined turning movement of the steering part causes a projection to engage and return said member to normal position, manually operable means on said members extending outwardly from the case to enable said members to be individually reciprocated, and a lever pivoted at one end to said case between said sets of contacts and having its opposite end portion projecting outside the case for manual operation, laterally extending arms on said lever, and cam surfaces on the end portion of said arms for engagement with said reciprocable members for moving one or the other of said members to circuit closing position.

In testimony whereof, I have hereunto signed my name to this specification.

JOHN A. FISCHER.